United States Patent [19]

Robinson

[11] 3,820,508
[45] June 28, 1974

[54] DRINKING ARRANGEMENT FOR A HORSE
[76] Inventor: John R. Robinson, Route 2, Versailles, Ky. 40383
[22] Filed: Mar. 6, 1973
[21] Appl. No.: 338,454

[52] U.S. Cl. .............................................. 119/73
[51] Int. Cl. .......................................... A01k 07/00
[58] Field of Search ............... 119/73; 219/433, 419

[56] References Cited
UNITED STATES PATENTS

| | | | |
|---|---|---|---|
| 1,033,799 | 7/1912 | Harvey | 219/433 |
| 2,074,985 | 3/1937 | Hofferbert | 219/419 X |
| 2,392,208 | 1/1946 | Wilken | 219/311 UX |
| 2,511,721 | 6/1950 | Langenbahn | 119/73 |
| 2,665,366 | 1/1954 | Cleveland | 119/73 X |

Primary Examiner—Hugh R. Chamblee
Attorney, Agent, or Firm—Frank C. Leach, Jr.

[57] ABSTRACT

Drinking water for a horse is provided by supporting a removable bucket within a support bucket, which has a heat insulating jacket disposed therein with electrical heating means within the heat insulating jacket. This maintains the water in the removable bucket at a temperature at which it will not freeze when disposed in an unheated barn although a thin film of ice may form on the surface. A transformer reduces the current and voltage sufficiently to prevent electrocution of the horse if any electrical wire of the electric heating means should be exposed.

9 Claims, 5 Drawing Figures

FIG.1

DRINKING ARRANGEMENT FOR A HORSE

SPECIFICATION

It is necessary for a horse to have water to eat dry food such as hay, for example. If a horse does not have water to drink, the horse will not eat and will eventually die. Thus, sufficient water must be available to a horse for the horse to survive.

When raising thoroughbreds, it is desired for the horse to grow as much as possible. If the thoroughbred is not fed properly, the horse will not reach the desired size to enable the owner, who raises thoroughbreds for sale, to be able to sell the thoroughbred for a reasonable return at a yearling sale, for example.

When the temperature is below freezing, the water in an unheated barn will freeze. To enable a horse in an unheated barn to have water, the present practice has been to have the ice, which forms on the surface of the water and becomes too thick for the horse to break with the pressure of the horse's nose, occasionally broken to enable the horse to obtain some water.

However, since the employee cannot continuously break the ice, the period of time when water is available for drinking by the horse is limited. As a result, the horse does not have water available whenever the horse wishes to eat. This can affect the growth of the horse since the horse will not eat as much as the horse should.

The problem of drinking water for the horse in an unheated barn freezing becomes more acute at a race track since the horse is normally confined to a stall except when being worked out during the early morning hours. As a result, the horse is not able to find any source of drinking water except that in the stall in which the horse is confined. Since employees are normally not around the race track stall between late afternoon and early morning, there are a number of hours in which the horse does not have water available to drink if the temperature in the barn becomes sufficiently low to freeze the water. It is during these hours that the temperature reaches its lowest. This is detrimental to a thoroughbred since the horse does not eat when the horse wishes.

The present invention satisfactorily overcomes the foregoing problem by providing a drinking arrangement in which drinking water for the horse is prevented from freezing except for a possible thin film of ice at the surface and this can be easily broken by the pressure of the horse's nose when the horse wants a drink. Accordingly, the horse has available drinking water in an unheated barn at any time. Therefore, the horse can eat whenever the horse desires. This enables a yearling, for example, to grow like it should at this stage of its development. Furthermore, the drinking arrangement of the present invention insures that a thoroughbred at a race track has drinking water at any time even though there is no attendant.

The present invention utilizes an insulating container such as a bucket, for example, within which a container such as a bucket, for example, containing water can be disposed. Since a horse can be killed by coming in contact with normal 110 AC voltage, the present invention uses low voltage and low amperage while still obtaining sufficient heat to prevent the water from freezing. This insures that the horse will not be electrocuted if any electric wire should be accidentally exposed.

Because a horse tends to kick objects within the stall in which the horse is confined, there is always the possibility that the electric wires will be exposed. Furthermore, the support container of the drinking arrangement of the present invention can be damaged by the horse kicking, particularly at its upper open end.

The present invention employs a support rim at the upper end of the outer support container to prevent the horse from reducing the size of the opening into which the removable container, which contains the water, is disposed. Therefore, the outer support container has protection against being damaged at its upper end by the horse kicking.

An object of this invention is to provide a drinking arrangement for a horse or the like in which the water is available to the horse when the ambient temperature is below the freezing temperature of water.

Another object of this invention is to provide a drinking arrangement for a horse in which electricity is used to heat the water without danger of electrocution to the horse.

Other objects of this invention will be readily perceived from the following description, claims, and drawings.

This invention relates to a drinking arrangement for a horse or the like and includes a first container having side and bottom walls and an open top. Heat insulating means, which is disposed within the first container, insulates the side and bottom walls of the first container. Electric heating means is disposed within the heat insulating means. The first container is adapted to removably support a second container, which contains the water for the horse, within the electric heating means. Means maintains the voltage and current supplied to the electric heating means sufficiently low to prevent electrocution of a horse if the horse contacts any portion of the electric heating means that becomes exposed.

The attached drawings illustrate a preferred embodiment of the invention, in which.

Figure 1:
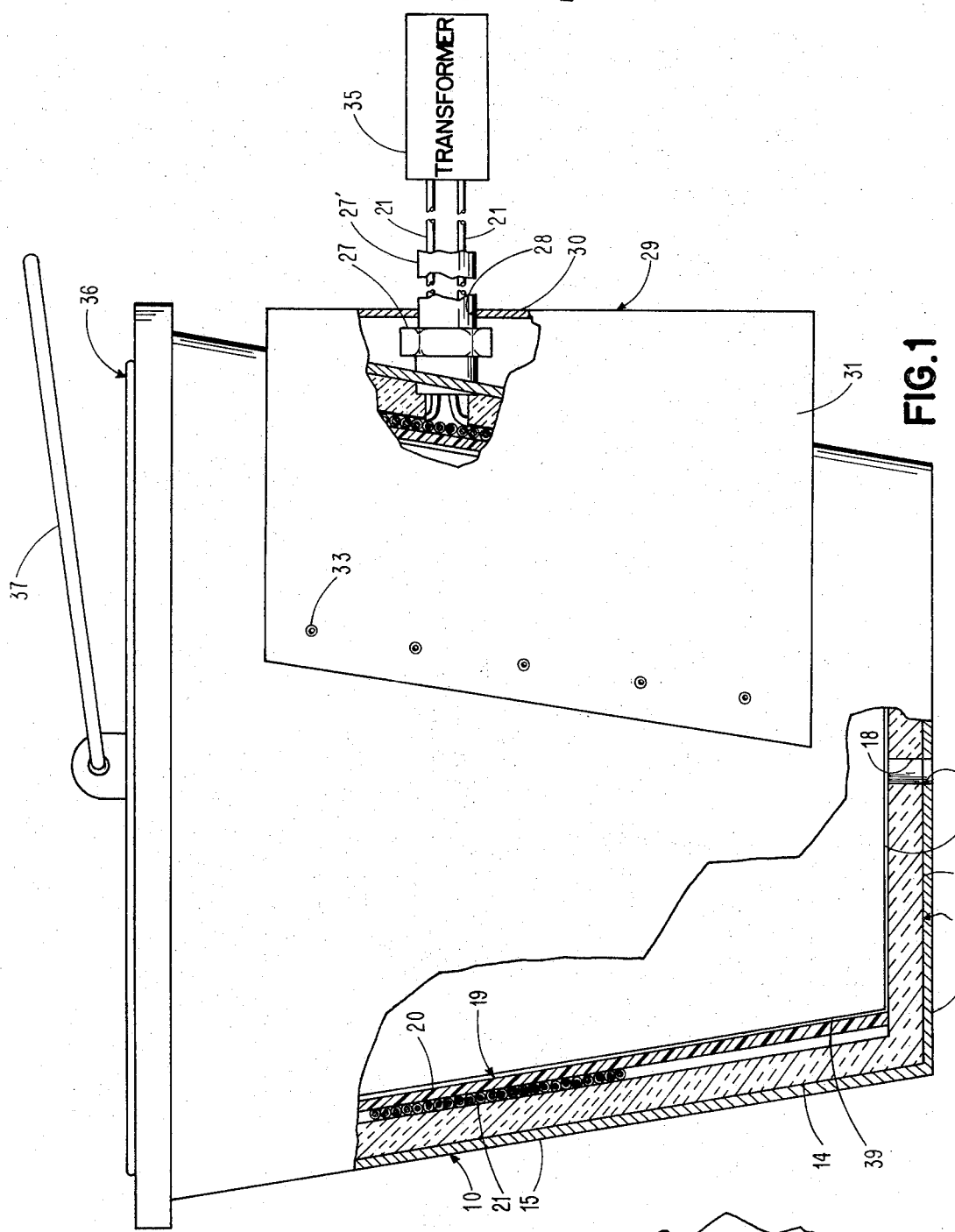
FIG. 1 is a side elevational view, partly in section, of the drinking arrangement of the present invention.
Figure 3:
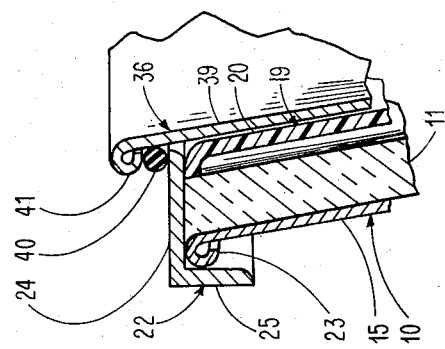
FIG. 3 is an enlarged sectional view of a portion of the drinking arrangement of FIG. 1.

Referring to the drawings and particularly FIG. 1, there is shown an outer support container 10, which is preferably a twenty quart galvanized bucket. An insulating jacket 11, which is formed of a suitable heat insulating material such as styrofoam, for example, is disposed within the container 10. The insulating jacket 11 has a bottom wall 12 and a side wall 14 extending upwardly from the bottom wall 12 with each preferably having a thickness of ½ inch. The jacket 11 is supported within the container 10 by merely being pushed therein. The side wall 14 of the jacket 11 has the same configuration as side wall 15 of the container 10 and extends for substantially the same height as the side wall 15 of the container 10 as shown in FIG. 3.

The container 10 has an opening 16 in the center of its bottom wall 17. The bottom wall 12 of the insulating jacket 11 has an opening 18 therein aligned with the opening 16 in the bottom wall 17 of the container 10. The openings 16 and 18 provide a weep hole, which preferably has a diameter of ¼ inch, to enable leakage of any water which might accidentally collect within the jacket 11.

The inner surface of the side wall 14 of the insulating jacket 11 has a wire heating sheath 19 adjacent thereto and supported by the bottom wall 12 of the insulating jacket 11. The sheath 19 is retained within the insulating jacket 11 by friction.

The sheath 19 includes a sleeve 20 of fiberglass having an electric wire heating element 21 surrounding it and disposed between the side wall 14 of the jacekt 11 and the sleeve 20. The wire heating element 21 is preferably a standard appliance wire.

One suitable example of the standard appliance wire, which forms the wire heating element 21, is sold by Belden Wire Company, Richmond, Indiana. The wire is 16 gauge AWG and is formed with stranded wires 26 × 30 AWG. All of the strands are covered by polyvinyl chloride insulation, which is covered by nylon braid. The wire is rated at 150° C. and is type SEWF-2. Any other suitable wire, which has a high temperature rating and a low voltage, may be employed as the wire heating element 21.

The sleeve 20 preferably has a thickness of ⅛ inch. While the sleeve 20 has its bottom end supported by the bottom wall 12 of the jacket 11, the wire heating element 21 preferably does not extend for the entire height of the side wall 14 of the jacket 11. The wire heating element 21 preferably extends along only the central portion since this will provide sufficient heat to prevent the water from freezing without the water becoming too warm. Accordingly, the wire heating element 21 preferably terminates about 4 inches above the bottom wall 12 of the jacket 11 and about 4 inches beneath the top of the jacket 11. Of course, if desired, the wire heating element 21 could extend to the bottom wall 12 of the jacket 11.

As shown in FIG. 3, an angle ring 22 is secured to upper rim 23 of the support container 10. The angle ring 22 includes a first annular portion 24, which is horizontally disposed and extends over the upper ends of the insulating jacket 11 and the sheath 19. The angle ring 22 has a second annular portion 25 extending downwardly from the outer end of the first annular portion 25 and beneath the rim 23. The angle ring 22 is secured to the rim 23 of the container 10 by suitable means such as welding, for example.

Thus, the angle ring 22 protects the upper end of the support container 10 from being damaged by the kicking of the horse. Furthermore, the insulating jacket 11 and the sheath 19 are covered and held within the container 10 by the angle ring 22.

The wire heating element 21 has its opposite ends extending therefrom through aligned openings in the side wall 14 of the jacket 11 and the side wall 15 of the support container 10. A conduit adapter coupling 27, which is preferably a standard fitting, is secured in the opening in the side wall 15 of the container 10 and has a conduit 27' secured thereto. The conduit 27', which has the ends of the wire heating element 21 extending therethrough, extends through an opening 28 in a U-shaped mounting bracket 29, which is supported on the outer surface of the side wall 15 of the container 10.

Figure 2:
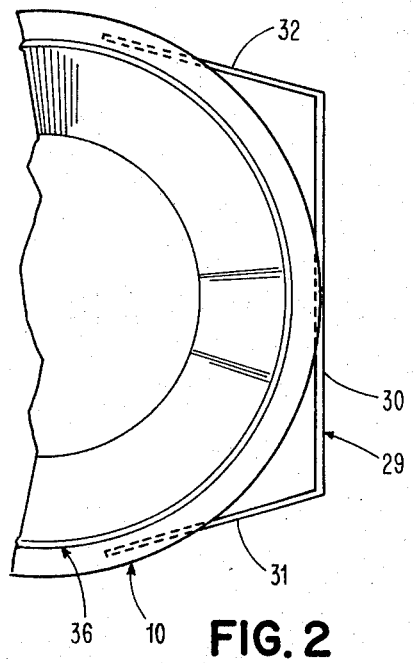
FIG. 2 is a fragmentary top plan view of the drinking arrangement of FIG. 1 with some portions omitted for clarity purposes.

As shown in FIG. 2, the mounting bracket 29 includes a central portion 30, which has the opening 28 therein, and side portions 31 and 32 diverging from opposite sides of the central portion 30. The side portions 31 and 32 of the mounting bracket 29 are secured to the outer surface of the side wall 15 of the container 10 by suitable means such as rivets 33 (see FIG. 1), for example.

Figure 4:
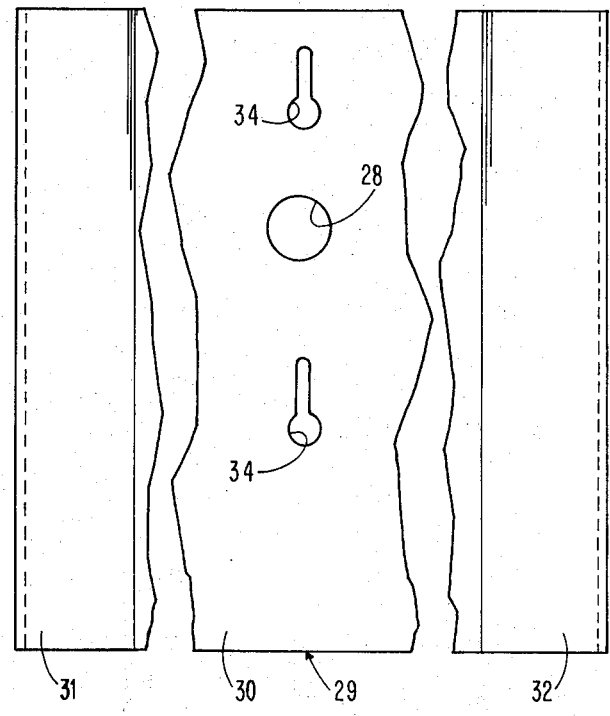
FIG. 4 is an end elevational view of a mounting bracket for the drinking arrangement of the present invention.

As shown in FIG. 4, the central portion 30 of the mounting bracket 29 has a pair of vertically aligned keyhole slots 34 formed therein. One of the keyhole slots 34 is disposed above the opening 28, and the other of the keyhole slots 34 is disposed beneath the opening 28.

Each of the keyhole slots 34 has an enlarged circular portion at its bottom with a diameter of approximately ½ inch to enable the head of a screw or nail, which would be fastened to a wall of the stall of the barn, to be received therein. Each of the keyhole slots 34 has an elongated thin portion extending upwardly from the enlarged hole. The elongated thin portion has a thickness of about 3/16 inch. This enables the screws or nails, for example, to have their heads pass through the mounting bracket 29 by being received in the enlarged portions of the slots 34 and then to support the mounting bracket 29 and the container 10 on the wall by the shank portions of the screws or nails being supported within the elongated thin portions of the slots 34.

Accordingly, the drinking arrangement of the present invention can easily be supported on the wall of a stall of a barn through fastening screws or nails, for example, to the wall. Thus, easy mounting and removal of the drinking arrangement is accomplished.

The ends of the wire heating element 21 extend through the conduit 27' to a transformer 35 (see FIG. 1), which is connected to a 110 volt AC source. The transformer 35, which is preferably a filament transformer, reduces both the voltage and the current to values that will not electrocute a horse if the horse contacts an exposed portion of the wire heating element 21. For example, the transformer 35 can reduce the voltage to 5 volts and the current to 10 amps. This will not electrocute a horse.

Water is disposed in a container 36, which is preferably a twenty quart galvanized bucket. The container 36, which has a handle 37, is disposed within the sleeve 20 of the heating sheath 19 as shown in FIG. 1 with the container 36 having its bottom wall 38 spaced above the bottom wall 12 of the insulating jacket 11. The container 36 has its side wall 38 adjacent to the sleeve 20 of the sheath 19 so that the water within the container 36 is heated.

The upper end of the container 36 has a sealing ring 40 (see FIG. 3) supported beneath its upper rim 41. The sealing ring 40 engages the upper surface of the first annular portion 24 of the angle ring 22 to form a seal therebetween. One suitable example of the material of the sealing ring 40 is rubber. The sealing ring 40 reduces heat loss between the angle ring 22 and the side wall 39 of the removable container 36.

Figure 5:
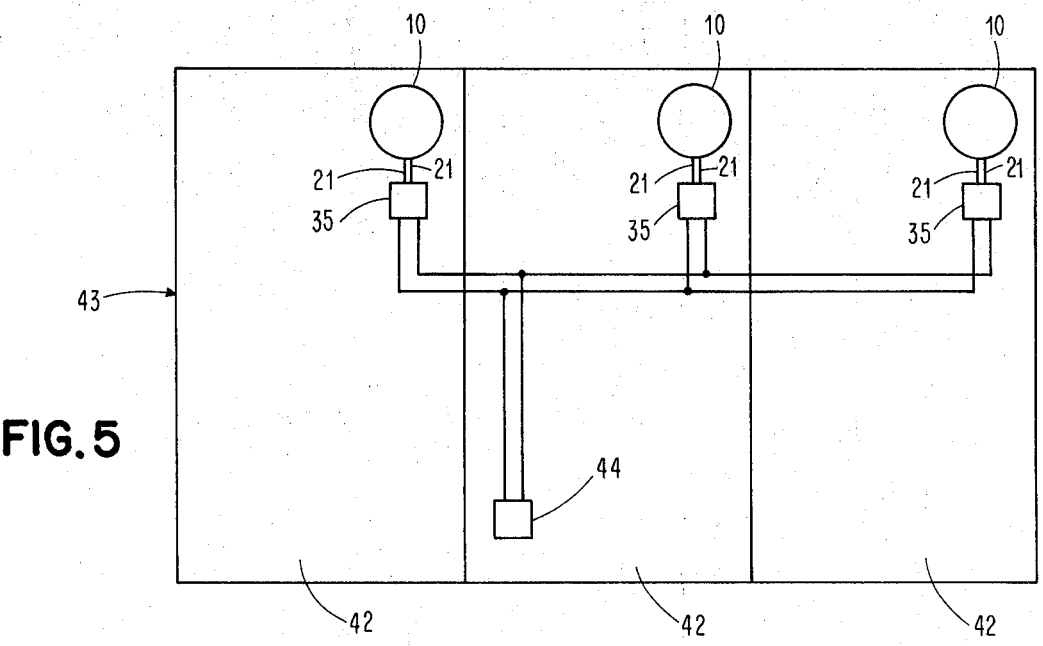
FIG. 5 is a schematic view showing a plurality of the drinking buckets in a barn.

As schematically shown in FIG. 5, each of a plurality of stalls 42 of a barn 43 may have one of the drinking arrangements of the present invention disposed therein. Each of the transformers 35 is connected in parallel to a thermostat 44, which controls when the wire heating element 21 receives electricity from the AC source to heat the water in the removable inner containers 36.

Accordingly, to supply water to horses in a plurality of the stalls 42 in the barn 43, it is only necessary to mount one of the outer support containers 10 within each of the stalls 42 by means of the mounting bracket 29. Then, the container 36, which has water therein, can be disposed within the insulating jacket 11 as shown in FIG. 1.

The thermostat 44 allows the wire heating element 21 to receive electricity whenever the ambient temperature is low enough to freeze the water. Thus, the horse will always have drinking water.

A test has been conducted of the drinking arrangement of the present invention in which the drinking arrangement was disposed within a food freezer in which the temperature varied from 4° F to −4° F. After five days in the food freezer, the water in the removable container 36 was still not frozen although there was a thin film of ice on the upper surface thereof. However, this can be easily broken by a horse with a minimum pressure.

An advantage of this invention is that it enables a horse to have water in an unheated barn when the ambient temperature is below the freezing temperature of water. Another advantage of this invention is that it prevents electrocution of a horse while using an electric heating element.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A drinking arrangement for a horse or the like for use in a non-heated ambient including:
   a first container having a side wall, a bottom wall, and an open top;
   means supported by said first container for removably mounting said first container on a wall;
   heat insulating means disposed within said first container to insulate said side and bottom walls of said first container;
   electric heating means disposed within said heat insulating means, said electric heating means including an electric heating element extending along at least a portion of the inner surface of said heat insulating means disposed within said side wall of said first container;
   said first container being adapted to removably support a second container containing the water for the horse within said electric heating means;
   and means to maintain the voltage and current supplied to said electric heating means sufficiently low to prevent electrocution of the horse if the horse contacts any portion of said electric heating means that becomes exposed.

2. The arrangement according to claim 1 in which said electric heating element extends along only the middle portion of the inner surface of said heat insulating means disposed within said side wall of said first container, said electric heating element terminating above said bottom wall of said first container and beneath said open top of said first container.

3. The arrangement according to claim 2 in which:
   said heat insulating means comprises an insulating jacket;
   said insulating jacket includes a side wall, a bottom wall, and an open top;
   and said insulating jacket has the same configuration as said first container and has its bottom wall resting on said bottom wall of said first container.

4. The arrangement according to claim 3 in which said first container has means to seal the tops of said heat insulating means and said electric heating means when the second container is removably supported by said first container, said sealing means comprises an angle ring supported at the upper end of said first container, said angle ring having a first annular portion extending over the tops of said heat insulating means and said electric heating means and a second annular portion extending downwardly from the outer end of said first annular portion to surround the upper end of said first container.

5. The arrangement according to claim 4 in which the inner surface of said electric heating means has the same configuration as the outer surface of the second container so that the second container is disposed adjacent to said electric heating means to transfer heat to the water in the second container.

6. The arrangement according to claim 5 in which said first annular portion of said angle ring cooperates with sealing means on the second container to form a seal therebetween to reduce heat loss.

7. The arrangement according to claim 1 in which said first container has means to seal the tops of said heat insulating means and said electric heating means when the second container is removably supported by said first container, said sealing means comprises an angle ring supported at the upper end of said first container, said angle ring having a first annular portion extending over the tops of said heat insulating means and said electric heating means and a second annular portion extending downwardly from the outer end of said first annular portion to surround the upper end of said first container.

8. The arrangement according to claim 1 in which:
   said heat insulating means comprises an insulating jacket;
   said insulating jacket includes a side wall, a bottom wall, and an open top;
   and said insulating jacket has the same configuration as said first container and has its bottom wall resting on said bottom wall of said first container.

9. The arrangement according to claim 8 in which said first container has means to seal the tops of said heat insulating means and said electric heating means when the second container is removably supported by said first container, said sealing means comprises an angle ring supported at the upper end of said first container, said angle ring having a first annular portion extending over the tops of said heat insulating means and said electric heating means and a second annular portion extending downwardly from the outer end of said first annular portion to surround the upper end of said first container.

* * * * *